United States Patent Office 3,065,840
Patented Nov. 27, 1962

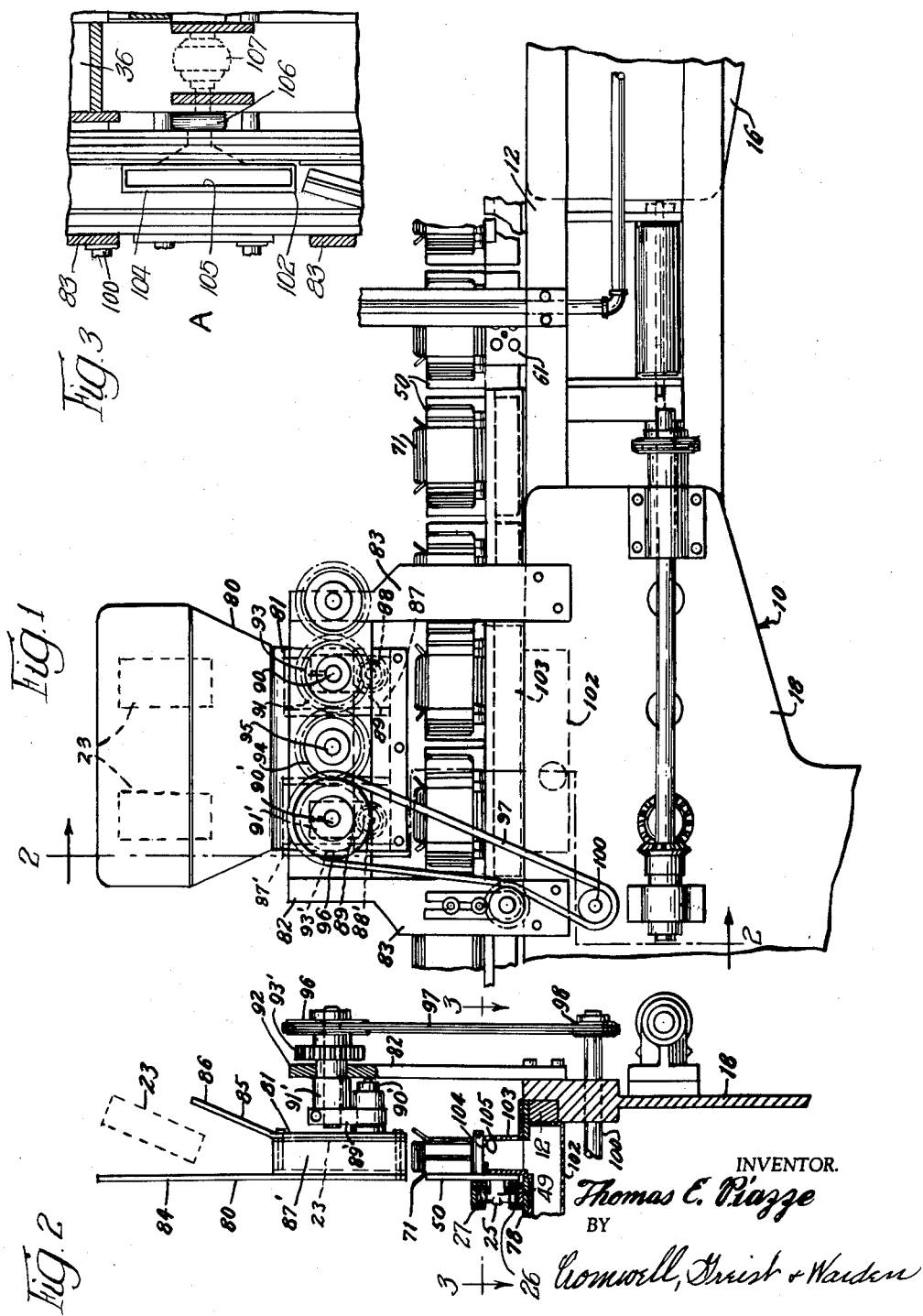

---

3,065,840
CONTAINER FILLING AND CLOSING MACHINE
Thomas E. Piazze, Mount Vernon, Ohio, assignor to Continental Can Company, Inc., New York, N.Y., a corporation of New York
Application Dec. 23, 1959, Ser. No. 861,577, which is a division of application Ser. No. 660,299, May 20, 1957, now Patent No. 2,952,959, dated Sept. 20, 1960. Divided and this application Jan. 26, 1961, Ser. No. 85,043
7 Claims.  (Cl. 198—26)

This invention relates to packaging machines and is more particularly concerned with the improvements in a machine for receiving a container formed of pliable sheet material from a container forming machine, filling the container with a commodity, closing the top of the filled container and sealing the same.

This application is a division of my copending application Serial No. 861,577, filed December 23, 1959, which is a division of application Serial No. 660,299, filed May 20, 1957, now Patent No. 2,952,959, dated September 20, 1960.

It is a general object of the invention to provide a continuously operating machine having a pocketed conveyor for receiving open topped tube-like containers of pliable heat sealable material from a container making machine and for advancing the container beneath successive mechanisms positioned along the path of the conveyor for filling each container with a predetermined quantity of merchandise, for folding the top portions of the end walls of the container to form a closure, and for heat sealing the closed top.

It is a more specific object of the invention to provide a mechanism for receiving successive pairs of open bags from a supply line and for properly seating the bags in the pocket forming mandrels on the continuously operated conveyor of a bag filling and closing mechanism.

Another object of the invention is to provide in a container forming, filling and closing operation a method and means for transferring containers from an intermittently operating container fabricating machine in multiple side-by-side relation to upwardly opening container receiving pockets which are arranged in single file relation on the continuously traveling conveyor of a container filling and top closing and sealing machine.

These and other objects of the invention will be apparent from a consideration of the mechanism which is shown by way of illustration in the accompanying drawings wherein:

FIGURE 1 is a partial elevation of the bag receiving side of the filling and closing machine showing the bag transfer mechanism;

FIGURE 2 is a cross section taken on the line 2—2 of FIGURE 1; and

FIGURE 3 is a fragmentary horizontal section taken on the line 3—3 of FIGURE 2.

Referring to the drawings, there is illustrated a portion of a machine for filling and closing a container of the square bottom type which is formed of heat sealable sheet or web material and which is delivered to the machine in squared up or opened condition. The machine is particularly adapted for use with a container fabricating machine of the type in which a series of forming mandrels are carried in double line arrangement on an endless conveyor and sheets of relatively flexible container forming material are folded over the ends of the mandrels to form flat bottom containers having vertical side seams. After the material is folded over the mandrels and the seams are formed, the containers are removed from the mandrels and delivered to the filling and closing machine through a transfer mechanism in which the present invention is embodied. A suitable machine for fabricating the containers is disclosed in my copending application Serial No. 861,577, filed December 23, 1959.

The filling and closing machine includes a continuously driven endless conveyor supported on a frame structure for movement in a horizontal plane and provided with a series of upwardly opening pocket forming mandrels in which the flat bottom containers or bags are adapted to be received from the container fabricating machine. The bag feeding or transfer mechanism of the present invention is arranged at a station along the conveyor for delivering successive pairs of the bags in upwardly open relation into the mandrel pockets on the endless conveyor.

The machine comprises a generally rectangular upright supporting structure 10 with a top frame comprising side rails 12 and suitable connecting cross rails and brace members. The top frame is supported on base forming upright side plate members 16 and 18 at opposite ends of the machine.

Mechanism for supporting and carrying the bags 23 is provided which comprises a bag carrying and supporting conveyor 25 mounted on the top frame of a supporting structure 10 for movement in a horizontal plane. The conveyor 25 comprises a pair of vertically spaced end chains 26 and 27 which are held in vertically spaced relation by pairs of brackets 49. The brackets 49 extend in spaced relation along the length of the conveyor 25 and carry upwardly opening pocket forming mandrel supporting assemblies 50, each of which is provided with an upwardly opening mandrel 71 for receiving in supporting relation therein a bag 23.

The empty bags shown at 23 (FIGURE 1) are supplied to the pocket forming mandrels 71 in pairs from a suitable source, preferably an intermittently operating duplex bag making machine associated with the present apparatus such as disclosed in my copending application Serial No. 861,577. The bags 23 are delivered to the conveyor 25 at the station indicated at A in FIGURE 3 through a transfer chute mechanism 80. The bags are delivered to a vertical hopper 81 which is mounted on an upright frame 82 of inverted U-shaped configuration having the lower ends of the legs 83 spaced along and secured to the outer face of the rear frame member 18 at the bag delivery station A. The hopper 81 comprises a vertical front plate 84 and a back plate 85 with the back plate 85 having a rearwardly flared upper flange section 86. The hopper 81 which is of generally rectangular cross section and open at the top and bottom is supported in forwardly extending relation on the upright frame 82 so that the bottom end is positioned above and in vertical alignment with the open tops of the pocketed mandrels 71 which are carried on the conveyor 25. The hopper 81 is divided into two separate, spaced bag receiving sections or passageways by vertically extending channel-like members 87, 87' positioned between the front and back walls 84 and 85 and spaced a distance apart corresponding to the spacing of the mandrels 71 on the conveyor 25. The hopper 81 is moved in a closed circular path to deliver the bags two at a time to the pockets in the continuously advancing conveyor 25 beneath the same. The rear plate 85 of the hopper 81 is provided with a pair of pivot pin members 88, 88' which are spaced in the longitudial direction of the machine and pivotally mounted in the ends of a pair of crank arms 89, 89' which are in turn secured on the inner ends of a pair of shaft members 90, 90', the latter being supported in bearing members 91, 91' secured in the upper cross or top plate 92 of the supporting frame 82. The operating shafts 90, 90' each carry a gear 93, 93' at the outer end. The gears 93, 93' are connected by an idler gear 94 mounted on a stub shaft 95 so that the two gears 93, 93' rotate in the same direction to drive the crank arms 89, 89' simultaneously in the same direction. One shaft 90 has its outer end extended and receives a sprocket 96 which is connected by a drive chain 97 with a sprocket 98 on the cross shaft 100 which extends between the side frame members 17 and 18 which constitutes one of the combination cam and drive shafts for the mechanism.

A suction device is associated with the conveyor at station A which comprises a suction box 102 having a portion 103 at the top which extends through the plate 78 on the top frame of the supporting structure and has a top plate 104 aligned beneath the path of the mandrels 71 with an opening 105 so that suction is applied through the apertures in the bottom of the mandrels 71 as the latter slide over the suction plate 104 to insure proper seating of the bags 23 therein. The suction box 102 is connected to a pump 106 which is driven by the motor 107 and the entire mechanism is mounted on a cross frame structure extending between the side frame members of the machine.

I claim:

1. In a bag filling machine having an upright supporting frame and a continuously moving horizontal conveyor provided with a series of upwardly opening pocket forming bag receiving members, a mechanism for delivering bags in succession into said bag receiving members comprising a vertically extending frame having a pair of laterally spaced guide chutes adapted to receive successive pairs of bags therein, an upright support for said frame, a pair of crank arms connected to said frame and mounted on parallel shafts journaled in said upright support, a drive means connected to one of said shafts, gears connecting said shafts for simultaneous rotation in the same direction whereby to move said frame in a closed circular path in a vertical plane above the line of travel of the pocket forming members on said conveyor in timed relation to the movement of the conveyor to align the lower ends of the guide chutes with successive pairs of pockets on the conveyor for delivery of bags into the latter while the frame moves in the same direction and at the same speed as the conveyor.

2. In a bag filling machine having an upright supporting frame and a continuously moving horizontal conveyor provided with a series of upwardly opening pocket forming bag receiving members, a mechanism for delivering bags in succession into said pocket forming members comprising a vertically extending frame having spaced vertically disposed guideways adapted to receive successive pairs of bags therein, said frame being mounted for movement in a closed path in a vertical plane with the lower portion of the path of movement thereof extending above the line of travel of said conveyor and over the pocket forming members on said conveyor and means for moving said frame in said path in timed relation to the movement of the conveyor to align the lower ends of the guideways with successive pairs of pocket forming members on the conveyor for delivery of the bags into the latter while the frame and the conveyor are advancing in unison.

3. In a bag filling machine, an upright supporting frame, a continuously moving horizontal conveyor mounted on said frame and provided with a series of upwardly opening pocket forming bag receiving members having bottom openings, mechanism for delivering bags in succession into said pocket forming members comprising a vertically extending guideway forming frame adapted to receive successive bags therein, said frame being mounted for movement in a closed path above the line of travel of the pocket forming members on said conveyor and means for moving said frame in said path in timed relation to the movement of the conveyor to align the lower end of the guideway above a pocket forming member on the conveyor for delivery of a bag into the latter during advance of the frame with the conveyor.

4. A method of transferring containers in multiples from an intermittently operating container fabricating machine to a single line continuously traveling pocketed conveyor which comprises advancing the containers in multiple side-by-side arrangement to a transfer position above the line of travel of the traveling conveyor, aligning the containers simultaneously with a corresponding number of pockets in the conveyor and depositing the containers in the pockets while moving the containers simultaneously in the same direction as the direction of advance of the conveyor.

5. A method of transferring a plurality of containers from an intermittently operating container fabricating machine to a conveyor which has a single line of upwardly opening container supporting pockets and which is traveling continuously in a direction transversely of the line of travel of the containers as they leave the container fabricating machine, said method comprising moving the containers in multiple side-by-side relation to a point above the line of travel of the conveyor, aligning the containers with a corresponding number of pockets in the conveyor and moving the containers simultaneously in the direction of advance of the conveyor and downwardly into the pockets while applying suction to the bottom of the pockets thereby to deposit the containers in the pocket.

6. In a bag handling machine having an upright supporting frame and a continuously moving horizontal conveyor provided with a series of upwardly opening pocket forming bag receiving members, a mechanism for delivering bags in succession into said pocket forming members comprising a vertically extending frame having a pair of laterally spaced, open ended guide chutes adapted to receive successive pairs of bags therein, an upright support for said frame, a pair of crank arms connected to said frame and mounted on longitudinally spaced, parallel shafts journaled in said upright support, a drive means connected to one of said shafts, gears connecting said shafts for simultaneous rotation in the same direction whereby to move said guide chutes in a closed, generally circular path above the line of travel of the pocket forming members on said conveyor in timed relation to the movement of the conveyor so as to align the lower ends of the guide chutes with successive pairs of pockets on the conveyor for delivery of bags into the latter at a predetermined point in each cycle of movement of the frame.

7. In a bag handling machine as recited in claim 6 and means forming a vacuum chamber beneath the pocket forming members of the conveyor for applying suction to the bags to seat the bags in the pocket forming members when the bags are delivered thereto from the guide chutes of said transfer mechanism.

References Cited in the file of this patent

UNITED STATES PATENTS 2,860,761  Kocau _____ Nov. 18, 1958